Figure 1:
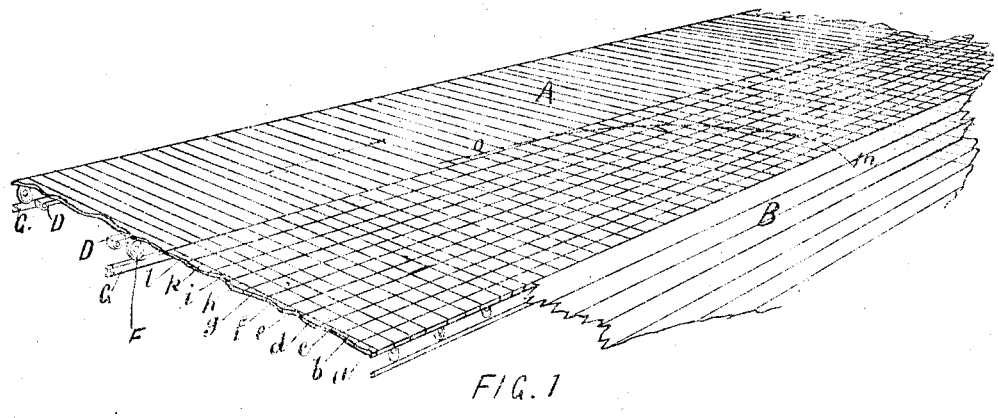

(No Model.) 4 Sheets—Sheet 1.

W. J. MUNDEN.
SYSTEM OF LOCOMOTION AND CONVEYANCE.

No. 421,186. Patented Feb. 11, 1890.

Witnesses
Robert F Thompson
Richard Cay

Inventor.
William J. Munden.

(No Model.) 4 Sheets—Sheet 2
W. J. MUNDEN.
SYSTEM OF LOCOMOTION AND CONVEYANCE.
No. 421,186. Patented Feb. 11, 1890.
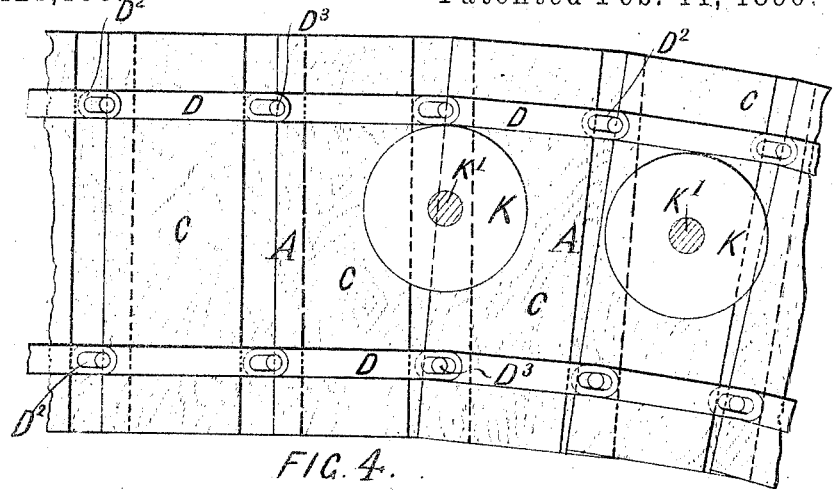
FIG. 4.
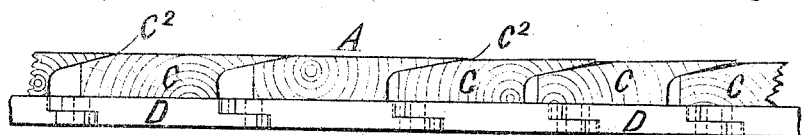
FIG. 5.
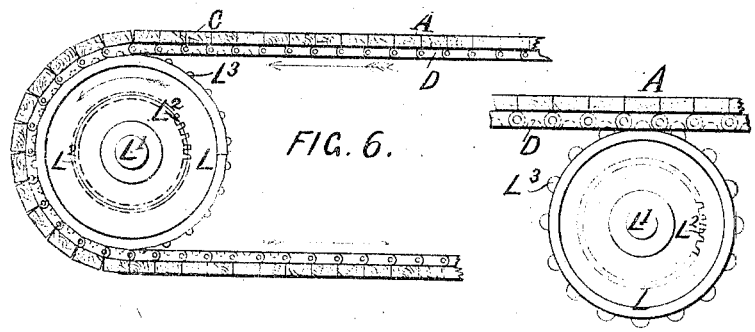
FIG. 6.
FIG. 8.
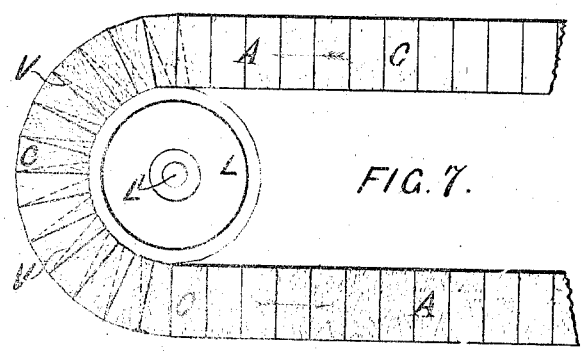
FIG. 7.
Witnesses
Robert J. Thompson
Richard Guy
Inventor
William J. Munden (No Model.) 4 Sheets—Sheet 3.

W. J. MUNDEN.
SYSTEM OF LOCOMOTION AND CONVEYANCE.

No. 421,186. Patented Feb. 11, 1890.

Witnesses: Inventor
William J. Munden.

(No Model.) 4 Sheets—Sheet 4.
W. J. MUNDEN.
SYSTEM OF LOCOMOTION AND CONVEYANCE.
No. 421,186. Patented Feb. 11, 1890.
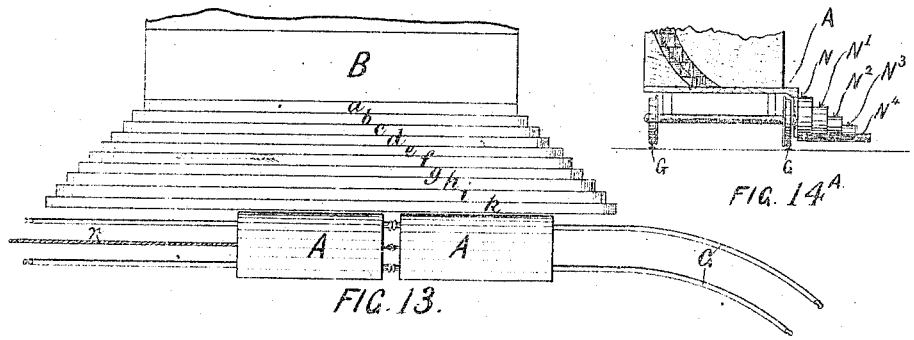
FIG. 13.  FIG. 14ᴬ.
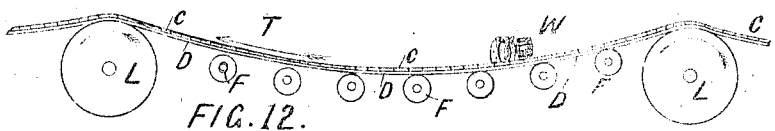
FIG. 12.
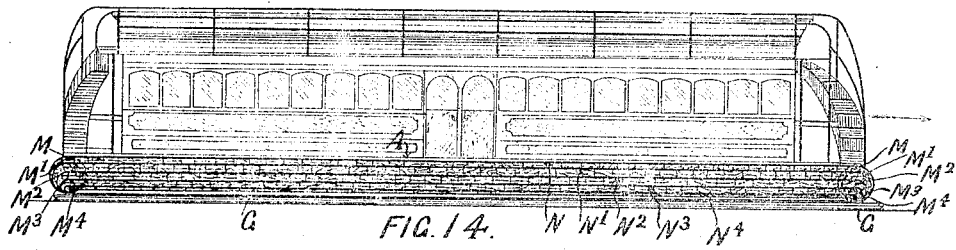
FIG. 14.
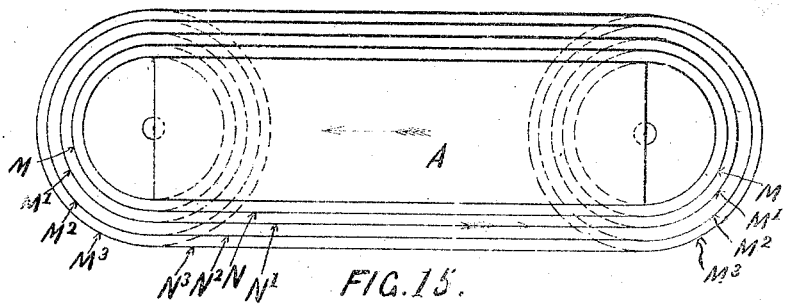
FIG. 15.
Witnesses
Robert F. Thompson
Richard Guy
Inventor
William J. Munden

_UNITED STATES PATENT OFFICE._

WILLIAM JOHN MUNDEN, OF LONDON, ENGLAND.

SYSTEM OF LOCOMOTION AND CONVEYANCE.

SPECIFICATION forming part of Letters Patent No. 421,186, dated February 11, 1890.

Application filed March 30, 1889. Serial No. 305,438. (No model.)

*To all whom it may concern:*

Be it known that I, WILLIAM JOHN MUNDEN, a subject of the Queen of Great Britain, residing at 70 Balcombe Street, Dorset Square, London, England, have invented a new and useful Improvement in a System of Locomotion and Conveyance, of which the following is a specification.

My invention has for its principal object the enabling of persons to enter or leave a moving platform or vehicle, or, in more general terms, to pass from a fixed surface to a moving one, or from a moving surface to a fixed one, or from one moving surface to another moving at a very different speed, without inconvenience, the purpose in general being to obtain access to a vehicle or its substitute or equivalent for the purposes of locomotion and conveyance. As from its character it is peculiarly suitable for use with an endless belt forming a platform and running continuously in one direction, I will first describe it in connection with and forming an adjunct to such continuous belt-platform, which latter I will hereinafter refer to as the "main platform." This main platform takes the place of the present rolling-stock or cars of a railway, being, in fact, a continuous car-floor upon which may be erected seats or cabs, either at intervals or continuously. It is formed of any suitable materials, preferably of planks, their lengths placed transversely to its line of progress, and their edges either overlaping each other or close together, so as to form a nearly plane surface, and is flexible laterally to the extent required for passing round curves, and in some cases also vertically, so as to allow it to pass round drums or their equivalents having their axes horizontally placed, or nearly so, at the ends of its length in the cases where it is required to return in the opposite direction underneath. In the cases in which the plan of the line is approximately circular or elliptic the main platform follows such plan, while in cases where this is not possible or convenient the belt can, at the extreme ends of the distance required to be covered, bend laterally round a drum or its equivalent having its axis approximately vertical, and return in an opposite direction alongside. This main platform is caused to progress by the end drums, before referred to, being forced to revolve, or by any other available means.
For the purpose of obtaining access to or exit from such a main platform I arrange by its side a series of belts, the upper surfaces of which form platforms similar to the main platform, but much narrower and running parallel thereto and to each other as close as is conveniently possible. These may in some cases extend the whole length of the main platform, but in general are arranged at convenient intervals to serve as stations or depots. We will suppose the main platform to be running six miles per hour. Then the narrow platform next it will run at five miles per hour, the next to this at four miles per hour, the next again at three miles per hour, the next at two miles per hour, and the last at one mile per hour, which last runs close by a fixed platform or surface to which passengers have convenient and ready access. A passenger standing upon this fixed platform can without inconvenience step from it to the nearest narrow platform, which moves at only one mile per hour, from this to the next moving at two miles per hour, from this to the one moving at three miles per hour, and so on from one to the other until the main platform is reached and he is traveling at six miles per hour, as there is a difference of only one mile per hour between any two adjoining platforms, and they form together one broad plane surface, each strip of which moves at a different speed; or he may walk from the main platform to the fixed platform in the same way. These narrow platforms can be arranged to form a series of steps, each one higher than its neighbor, so that a passenger ascends or descends from the fixed platform to the main platform, or vice versa. The platforms are generally formed by the upper surfaces of endless belts and operated in any convenient manner, and they, as well as the main platform, may be supported by wheels upon rails, or any other suitable construction may be adopted. The axles (upon which the drums revolve, which carry the narrow platforms) are sometimes attached to and are carried forward with the side or sides of a car or train of cars of any description, or to the side or sides of a main platform, as hereinbefore described. In this case the one nearest the side of the car or main platform moves very slowly, (by reason of the drums being caused to revolve,) the second from the car somewhat faster, the third faster still, and so on until the outside one runs at approximately the same speed as the car, but all these in the opposite direction from that in which the car or main platform is moving. As the car moves forward and the outside platform (which is placed at a convenient height from the ground for a step) at the same speed backward, it follows that any point in the outside platform is relatively to the ground quite or nearly motionless, and obviously it will be easy for a passenger to step from the ground upon it, and from thence to the next, and so on (as the difference of speed of each platform from the next is small) until the car or main platform is reached, or he can descend in the same manner. For the purpose of obtaining access to a moving ship or boat I sometimes float the moving platforms upon water, in which case, as likewise when the moving surface to be gained is a car or vehicle, it must be run alongside the moving platform which runs the fastest. The passenger having arrived upon the continuous main platform, when this is used, can, if in great haste to arrive at his destination, walk forward upon it, (one side being left clear of seats for that purpose,) thus adding his pedestrian speed to that of the platform; or I sometimes make the main platform with a track for tram-cars, which are propelled thereon by any suitable means at a still greater speed.

Figure 2:
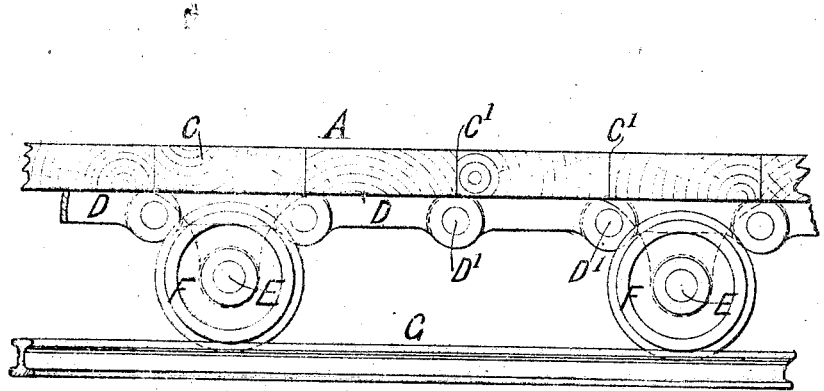
Figure 3:
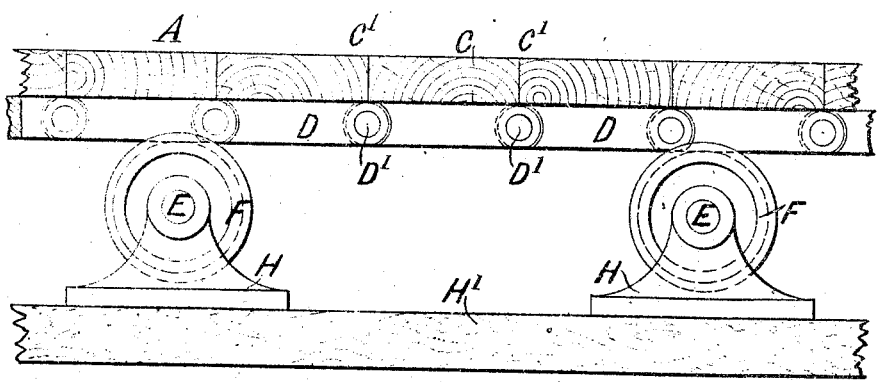
Figure 9:
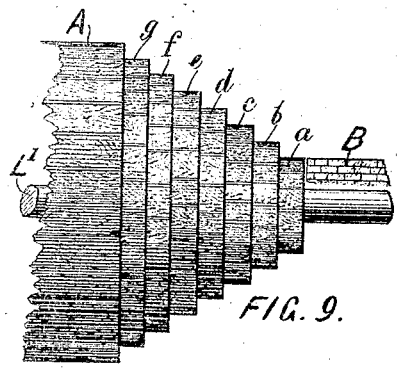

In the accompanying drawings, which illustrate my invention, Figure 1 is a perspective view of part of a main and narrow platforms. Fig. 2 is a side elevation of one kind of platform and chain used. Fig. 3 is a side elevation of an alternative platform and chain. Fig. 4 is a plan of under side, and Fig. 5 a side elevation of another platform and chain. Fig. 6 is an elevation of a platform and chain passing round an end drum which has its axis horizontal. Fig. 7 is a plan of a platform passing round an end drum which has its axis vertical. Fig. 8 is a side elevation of an intermediate drum driving a platform. Fig. 9 is an end elevation, and Fig. 10 a diagrammatic side view, of a series of platforms at different heights. Fig. 11 is a plan of part of a line and a junction. Fig. 12 is an elevation of a chain and platform, showing a method of suspension and support. Fig. 13 is a plan showing cars running alongside a series of narrow platforms. Fig. 14 is a side elevation, and Fig. 14$^A$ a part end elevation, of a car with narrow platforms attached. Fig. 15 is a plan of a different car-floor with platforms attached.

I will now proceed to describe each figure in detail, first premising that I do not confine myself to any particular description of chain or platform, or to any particular mechanism for propelling, supporting, or guiding same; but while describing and showing some typical forms construct my platforms in the most convenient manner suitable to each particular case, always retaining the feature of my invention which consists in a platform in which the parts adjoining the fixed surface move very slowly and the parts adjoining the moving surface or vehicle move much faster, while the parts between these move at speeds so gradually varying from one to the other that no inconvenience is felt in walking over them.

Fig. 1 is a perspective view of part of a platform formed by an endless belt according to my invention. This may be of any convenient length, but is here shown broken off at each end. A is the upper surface of the endless belt, which forms a main platform running continuously at the rate of six miles per hour in the direction indicated by the arrow. This main platform is held together by one or more chains, (two links D D of which are shown running underneath, one near each edge,) and having wheels F attached to it, running on rails G. B is a fixed platform upon which passengers walk previous to commencing a journey or after completing one. Close by and parallel to the side of this is an endless belt forming a narrow platform $a$, running continuously in the same direction as the main platform at a speed of half a mile per hour. Next again to this is another similar endless belt forming a narrow platform $b$, running at a speed of one mile per hour; next again, a third $c$, running one and a half mile per hour; a fourth $d$, running two miles per hour, and so on, through the different remaining narrow belt-platforms $e, f, g, h, i, k$, and $l$, each increasing in speed half a mile per hour from the fixed platform until the speed of the narrow platform $l$ is five and a half miles per hour, and this latter runs close by and parallel to the side of the main platform A. It will be understood from the foregoing that each of these narrow platforms, as well as the main platform A, are so constructed that their upper surfaces form a smooth plane floor, and as each platform runs close to the side of the next one plane surface extends from the fixed platform B to the farther edge of the main platform A, each belt-platform running at a different speed in the same direction. A person then, having entered upon the fixed platform B and standing at the point marked $m$, can easily step upon the first narrow platform $a$, (which moves only half a mile per hour, or about eight inches per second,) and from this first narrow platform $a$ to the second $b$, as this latter only runs half a mile per hour faster than $a$, and so on over $c, d, e, f, g, h, i, k$, and $l$ until the main platform A is reached; but during the time occupied in taking the twelve steps over the platforms he will have been moving forward, and the direction he will have taken is shown approximately by the chain-dotted line from $m$ to the point marked $o$. This means that by the time he reaches the main platform he will have advanced some fifteen or twenty yards on his journey. The main platform A may be of any length, extending, if required, in an unbroken line between the termini to be connected; but whatever its length at its ends it runs over and is moved by drums or their equivalents, so as to return in the opposite direction underneath, as shown in Fig. 6, or alongside, as shown in Fig. 7, except in the case of the line forming a circle or ellipse in plan, or approximating thereto, when the driving is effected as shown in Fig. 8. In any case when a long length of main platform is used this last description of drum is fixed at intervals of not more than one mile to drag the main platform forward, each of these driving-drums, whether at the ends or intermediately placed, being caused to revolve by any available and convenient power being applied to it. In some cases the motion of the platforms is intermittent.

Fig. 2 is a side elevation of a short length of a platform and chain, as sometimes used where the end drums have their axes horizontal, or nearly so. A is the platform, (here shown of wood planks C, the width of each plank from joint to joint C' C' being equal to the distance of centers D' D' of the links D, which form the chain.) Axles E are attached to some of these links or to the planks at intervals, (shown here at each third link,) on which axles revolve wheels F, which, running on an ordinary rail or girder G, forming a permanent way, support the whole weight of the chains, platform, and its superposed load of passengers or goods, and cannot bulge downward between the axles by reason of the joints D' of the planks pressing together, but being free to open in the manner shown in Fig. 6 when running over a horizontal drum.

Fig. 3 is a side elevation of a short length of an improved chain and platform, according to my invention, which I prefer to use, as the chain itself forms the rail and the permanent way consists merely of friction-wheels F, running on axles E, fixed in standards H, attached to the foundation or sleeper H'. The edges C' C' of the planks C, being coincident with the centers D' D' of links D, allows of the belt-platform bending easily in one direction; but it is rigid otherwise, thus forming a continuous rail or girder (on the under side of platform) which runs upon and is supported by the wheels F.

Fig. 4 is a plan of under side, and Fig. 5 a a side elevation of a short length of a chain and platform in which the links D are pivoted vertically, so that the platform can be flexed laterally, so as to pass round a curve in the line, or round a drum which has its axis vertical, (in the manner shown in Fig. 7,) and to enable this to be done the planks C, forming the platform, are shaped so as to so overlap each other, as shown at C², that when the platform bends laterally the inner side chain-links close up, while the outer side chain-links are still extended and pulling each other, as when the platform is straight. With this description of chain and platform it is necessary to place the horizontal wheels K (which guide the platform round a curve) in such a position as to bear upon the inside of the outer chain. These wheels K revolve upon vertical axles K', fixed to and forming part of the permanent way.

Fig. 6 is a side elevation, on a smaller scale, of part of a chain and platform, either of the description shown in Fig. 2 or in Fig. 3, passing round one of the end drums L, used for guiding, supporting, or driving the platform. L' is the shaft upon which this drum (or in some cases two or more drums) is fixed; and this shaft and drum or drums are caused to revolve by means of the toothed wheel L², gearing with a wheel fixed upon the driving-shaft of any available motor; or a train of mechanism or any other suitable means may be utilized for connecting the shaft L' with the shaft of the motor used to supply the power required to operate the drums L, and consequently the chains and platform by means preferably of the sprockets or teeth L³, which take into hollows in the links D; or the links may have projections formed upon them which take into depressions in the drums L; or any other convenient means of carrying forward the chains may be adopted.

Fig. 7 is a plan, on a small scale, of part of a platform (of the description shown in Figs. 4 and 5) passing round one of the end drums L, which has its axis or shaft L' vertical or nearly so, and which platform is thereby guided and propelled in one horizontal plane, or approximating thereto. The shaft L' is connected by any convenient mechanism with the motor-shaft used for operating the drums and chain. The links (of the description shown in Figs. 4 and 5) underneath the planks C of the platform, being slotted at their ends, allow of the closing up of the edges of the planks C underneath each other when passing round the drum L, as shown in dotted lines at V.

Fig. 8 is a side elevation of a drum as applied at any position intermediate between the extreme ends of the main platform for the purpose of driving and guiding it in the cases before referred to, where these are necessary on account of the length of line, or where the line is of circular or elliptic shape in plan and no end drums are required. The sprockets or teeth L³ on drums L take into hollows formed in the links D, and thus drag the chains and main platform forward, or any other convenient means for effecting this may be adopted.

Figure 10:
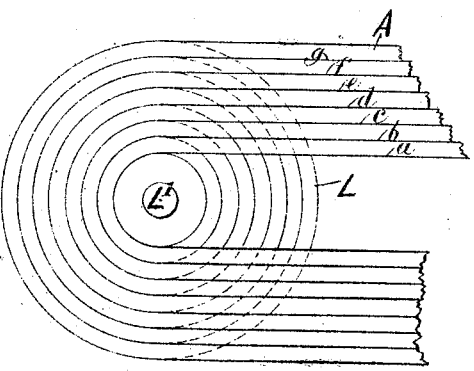
Figure 11:
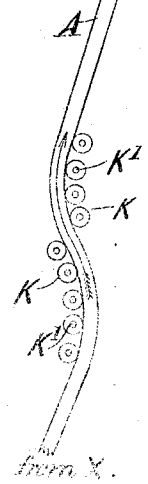

Fig. 9 is an end elevation, and Fig. 10 a diagrammatic side view, of the series of narrow platforms where arranged each one at a different level from the other, or terrace-shaped, so that the passenger ascends from the fixed platform B to the main platform A. The wide belt, (shown broken off in width,) which forms the main platform A, is here passing over one of the end drums on the shaft L', and is driven in any convenient manner. B is the fixed platform, and alongside of it at the same level runs the slowly-moving narrow platform a. At a convenient height for a step and closely parallel to it runs somewhat faster the second narrow platform b, the next again c, faster still, and so on through d, e, f, and g, which last runs close alongside the main platform A, which is the highest of all; or these relative positions may be reversed and the main platform A be placed lowest of all, when the passenger would descend from the fixed platform B over the narrow platforms to the main platform A. In this latter case the arrangement of drums would be varied to meet the changed positions.

Fig. 11 is a plan view of a portion of a line showing the methods of curving laterally by means of guide-pulleys K, having vertical or approximately-vertical axes or shafts K', the peripheries of which guide-pulleys meet either the side of the platform A or the side of one of the chains, as before described with reference to Figs. 4 and 5. This plan view shows also a convenient method of effecting junctions and of passing from one line to another. The main platform from X to Y moves in the direction of the arrow, and is propelled in any convenient manner. Running close by and parallel to its side for a short distance is the terminus of another main platform traveling in the direction of the arrow to Z and running over and propelled by the drum upon the shaft L'. The two main platforms being for a considerable distance close by the side of each other and running at the same speed, it is obvious that a passenger coming from X can at this point walk from the one main platform to the other, traveling toward Z without inconvenience; or if the two main platforms run in a direction opposite to that indicated by the arrows the passengers coming from Z can join those coming from Y and together proceed to X.

Fig. 12 is a diagram showing a method of erection of this chain and main platform, which presents many incidental advantages. According to this method, between one propelling-drum L and the next the supporting permanent-way wheels F, (hereinbefore referred to,) instead of being longitudinally level, is constructed in a catenary curve, (here very much exaggerated for illustration, but really so slight as to be unnoticeable by the eye,) so that the tendency of the longitudinal strain of haulage upon the chain or chains D is to lift it or them from the wheels F or other substructure forming such permanent way when without a load, as at T, but to such a slight degree that the weight of a few passengers or goods of any description upon one part W of the main platform brings the chain D, forming a rail, down upon the permanent-way wheels F, thus reducing the friction to a minimum, as only the parts of the main platform actually loaded press upon the wheels, and the remainder of the chain and platform is supported more or less freely by the longitudinal strain of haulage, or when wheels attached to the under side of platform run upon rails the same advantage is gained.

Fig. 13 is a plan of an arrangement for enabling passengers to enter or leave an ordinary vehicle while in motion. A A are the cars, which in this case take the place of the main platform. B is the fixed platform, preferably at the same level and accessible to intending passengers, who can easily step from it to the first narrow platform a, moving slowly in the direction of arrow, and from thence to the faster-moving one b, and so on till k is reached, which moves at about the same speed as the cars A, and it is therefore easy to step from one to the other for the purpose of embarking or disembarking. The cars A may be propelled in any convenient manner, and are here shown as drawn by a rope r.

Fig. 14 is a side elevation of a car according to my invention, in which the moving platforms are connected to and travel with the car itself. The car is traveling in the direction shown by the arrow at a rate, we will suppose, of five miles per hour, and in this case runs upon metal rails G; and it has attached to and projecting from its side or sides at each end horizontal axles equal in number to the number of platforms. Upon the axle at each end nearest the car runs a wheel M, carrying a belt N, having a speed of one mile per hour; a second M', carrying a belt N', having a speed of two miles per hour; a third $M^2$, carrying a belt $N^2$, having a speed of three miles per hour; a fourth $M^3$, carrying a belt $N^3$, having a speed of four miles per hour, and a fifth $M^4$, carrying a belt $N^4$, having a speed of five miles per hour, but all these running in the opposite direction from that in which the car is traveling. These belts N, N', $N^2$, $N^3$, and $N^4$ are arranged so as to form a series of narrow stair-platforms, the outside one $N^4$ being a few inches above the ground, and the inside one N next the car being at or about the same height as the floor A of the car. As the car itself runs five miles per hour in one direction and the belt $N^4$ runs five miles per hour in the opposite direction, it follows that any point in the upper part of the outside belt $N^4$ is relatively to the ground motionless, and a passenger can easily step from one to the other. From $N^4$ he can step onto $N^3$, and so on increasing in speed relatively to the ground one mile per hour at each step until the floor of the car is reached, and he can enter by either of the doors. In the same manner a passenger can descend from one to the other until the ground is reached. Although each of these belts is here shown at a different height, they can be at one level, if desired. Fig. 14ᴬ is a part end elevation of same.

Fig. 15 is a diagrammatic plan of the floor of a car and a series of belts forming platforms extending round it. These are attached to and move with the car. In this case the axles upon which the wheels $M$, $M'$, $M^2$, and $M^3$ run are vertical, and the belts $N$, $N'$, $N^2$, and $N^3$ run at different speeds in the opposite direction (on the side of the car used for mounting and dismounting) to the motion of the car. These belts can either be in one plane or form a series of steps at different heights.

Having fully described my invention, what I desire to claim and secure by Letters Patent is—

1. The combination of a number of longitudinal and closely-placed parallel bands, the upper surfaces of which form platforms moved along in one direction, but at relatively-increasing speeds from one side of the series to the other, as set forth.

2. The combination of a series of closely-placed parallel and longitudinal bands, the upper surfaces of which form platforms traversing in the same direction, but at relatively-increasing speeds, a fixed platform parallel with and adjoining that one of the said series of bands which is traversing at the slowest speed, and a moving platform parallel with and adjoining that one of the said series of bands which is traversing at the highest speed, as set forth.

3. The combination of a series of closely-placed parallel and longitudinal bands, the upper surfaces of which form platforms traversing in the same direction, but at relatively-increasing speeds, a fixed platform parallel with and adjoining that one of the said series of bands which is traversing at the slowest speed, and a car or train of cars or a vehicle moving parallel with and adjoining that one of the said series of bands which is traversing at the highest speed, as set forth.

4. The combination of a moving platform (or its equivalent, a car) adapted to travel on a permanent or road way, and a series of endless bands carried on the side of the said platform or car, the upper surfaces of said bands forming platforms which are traversing in a direction opposite to that in which the car is traveling at speeds increasing from the side of the car, as set forth.

In testimony that I claim the foregoing I have hereunto set my hand this 19th day of March, 1889.

WILLIAM JOHN MUNDEN.

Witnesses:
 RICHARD GUY,
14 *Loftus Road, Shepherd's Bush, London.*
 ROBERT FRENCH THOMPSON,
73 *Summerley Street, Earlsfield, London.*